Figure 1:
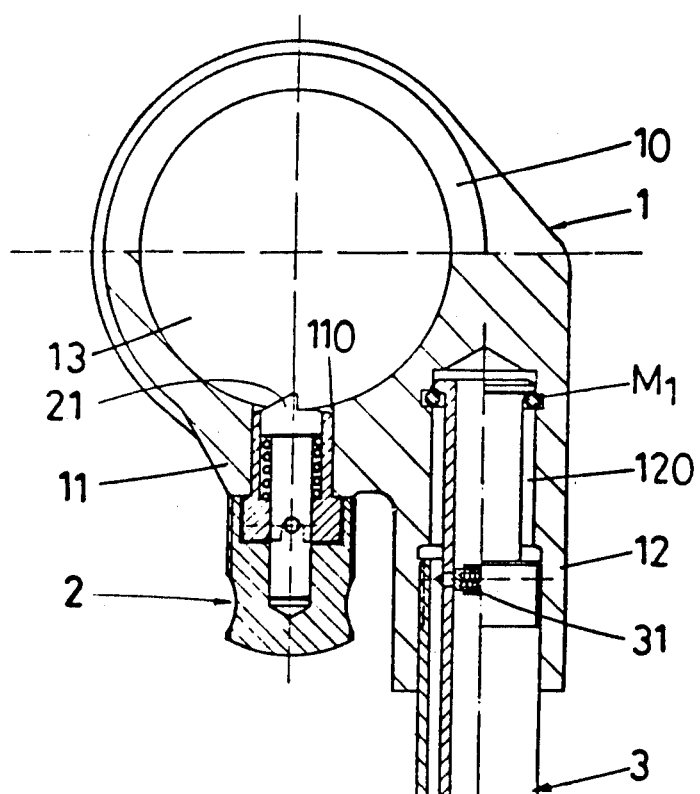

United States Patent [19]

Ollacarizqueta

[11] Patent Number: 4,780,031

[45] Date of Patent: Oct. 25, 1988

[54] RATCHET DIE STOCK

[75] Inventor: Manuel A. Ollacarizqueta, Abadiano, Spain

[73] Assignee: Super-Ego Tools, S.A., Spain

[21] Appl. No.: 36,916

[22] Filed: Apr. 10, 1987

[51] Int. Cl.$^4$ .......................... B23B 45/12; B23G 1/44
[52] U.S. Cl. ..................................... 408/123; 10/121; 408/239 A
[58] Field of Search ............... 408/123, 121, 221, 222, 408/239 A, 239 R, 120, 122; 10/121, 106

[56] References Cited

U.S. PATENT DOCUMENTS

| 332,801 | 12/1885 | Hines | 408/123 |
|---|---|---|---|
| 1,161,377 | 11/1915 | Broschart et al. | 408/123 |
| 1,450,211 | 4/1923 | Kopp | 408/123 |
| 2,388,790 | 11/1945 | Mackliet | 10/121 |
| 3,290,779 | 12/1966 | Bridges | 408/123 X |
| 4,111,591 | 9/1978 | Rolnick | 408/221 |
| 4,213,723 | 7/1980 | Wagner | 408/239 A |

FOREIGN PATENT DOCUMENTS

| 2619975 | 11/1976 | Fed. Rep. of Germany | 408/221 |
| 1108970 | 1/1956 | France | 10/121 |

Primary Examiner—Briggs, William R.
Attorney, Agent, or Firm—Lucas & Just

[57] ABSTRACT

A ratchet die stock comprised of a main body from which there protrude two parallel portions each possessing a hollow, and where such hollows accommodate a ratchet and pawl to provide unidirectional travel of the dies which are assembled in the head of the main body, and accommodate a telescopic handle, with one of such portions being tangentially positioned with respect to the head.

3 Claims, 1 Drawing Sheet

RATCHET DIE STOCK

This invention is concerned with an improved ratchet die stock of the kind which is comprised of a main body in whose head there is a spacious hollow wherein the die is inserted and positioned there with the ability to undergo working travel in a single direction only because of a ratchet and pawl mechanism.

The improved die stock covered by this invention is characterized because said main body is provided with two parallel machining or cutting portions, arranged to carry respectively the said pawl mechanism, and the operating handle so that such machining can be carried out simultaneously in a single operation.

It is also characterized because that portion of the main body onto which the operating handle is assembled, lies tangentially to the aforementioned head so that the angle of rotation is increased.

It is furthermore characterized inasmuch that the operating handle is attached onto said portion and is comprised of at least two telescopically assembled portions possessing their own positioning means which, through axial travel, attain their open/closed positions wherefor said handle adopts at least two positions, of which one is the working position and the other is the carrying or storage position.

It is moreover characterized because said two parallel portions differ in length from one another, the longer being the tangential one carrying the telescopic handle.

FIG. 1 is a general elevation view in section showing the improved ratchet die stock with which this invention is concerned, where all its parts and components are seen assembled in position thereon.

This improved die stock is of the kind that comprises a main body (1) having a well proportioned head (10) in which there is a spacious hollow (13) to accommodate, for instance, a die (not shown), where said die would be fitted into the hole (13) in head (10) with a non-return pawl (21) such as to allow rotation in a single direction only.

In accordance with this invention, and as shown in the practical construction thereof illustrated in the drawing, the main body (1) is comprised of two parallel portions (11), (12) which carry the ratchet and pawl mechanism (2) and the operating handle (3) respectively.

The ratchet and pawl mechanism (2) is not described in fuller detail here, because it is not an essential part of the invention.

Said ratchet and pawl mechanism (2) is located inside a hollow (110) that is machined in portion (11).

Portion (12), which is the one whereonto the handle (3) is attached, likewise possesses a machined hollow (120), and this, being enclosed at one end, comprises the housing for handle (3), which is held in position by its own means comprising the gasket ring (M1) and the securing pin (31).

Said handle (3) is of a telescopic design, and comprises two coaxial members (3a), (3b), capable of adopting at least two positions, where one is the working position and the other is the storage position, and it also has an end cap (4).

I claim:

1. An improved ratchet die stock of the kind which is comprised of a main body with a handle and with a head in which are assembled die-stocks and a ratchet and pawl mechanism, the improvement comprising:
   (a) a first hollow for accommodating said handle, said first hollow having an axis, said first hollow axis being tangential to said head such that when said handle is accommodated in said first hollow said handle is tangential to said head; and
   (b) a second hollow for accommodating said ratchet and pawl mechanism, said second hollow having an axis, said second hollow axis being parallel to said first hollow axis and said second hollow axis passing through the center of said head.

2. An improved ratchet die stock in accordance with claim 1 wherein both said hollows are formed in portions that protrude with respect to he head.

3. An improved ratchet die in accordance with the claim 1, wherein the handle is of the telescopic design, and comprises means of positioning and securing the telescopic members in the shortened or the extended positions.

* * * * *